(12) United States Patent
Zhang et al.

(10) Patent No.: US 8,009,597 B2
(45) Date of Patent: Aug. 30, 2011

(54) USING A SINGLE LOGICAL BASE TRANSCEIVER TO SERVE MULTIPLE PHYSICAL LOCATIONS

(75) Inventors: Yan Zhang, Bellevue, WA (US); Jayesh Sukumaran, Woodinville, WA (US); Elliott Hoole, Sammamish, WA (US); Greg Veintimilla, Sammamish, WA (US)

(73) Assignee: Broadcom Corporation, Irvine, CA (US)

( * ) Notice: Subject to any disclaimer, the term of this patent is extended or adjusted under 35 U.S.C. 154(b) by 985 days.

(21) Appl. No.: 11/894,034

(22) Filed: Aug. 17, 2007

(65) Prior Publication Data
US 2008/0045229 A1   Feb. 21, 2008

Related U.S. Application Data

(60) Provisional application No. 60/838,550, filed on Aug. 17, 2006.

(51) Int. Cl.
*H04B 7/00* (2006.01)
*H04B 7/212* (2006.01)
*H04W 4/00* (2009.01)
*H04W 24/00* (2009.01)
*H04W 36/00* (2009.01)
*H04W 40/00* (2009.01)
*H04W 72/00* (2009.01)

(52) U.S. Cl. ........ 370/310; 370/321; 370/329; 370/347; 455/423; 455/438; 455/445; 455/450

(58) Field of Classification Search ........... 370/321–337
See application file for complete search history.

(56) References Cited

U.S. PATENT DOCUMENTS

| | | | |
|---|---|---|---|
| 6,163,700 A * | 12/2000 | Hussain et al. | 455/453 |
| 6,434,137 B1 | 8/2002 | Anderson et al. | |
| 6,535,732 B1 | 3/2003 | McIntosh et al. | |
| 6,801,753 B1 | 10/2004 | Keong | |
| 6,973,054 B2 * | 12/2005 | Bjelland et al. | 370/310 |
| 7,058,029 B2 * | 6/2006 | Khawer et al. | 370/318 |
| 7,477,621 B1 * | 1/2009 | Loc et al. | 370/329 |
| 2002/0072371 A1 | 6/2002 | Hokkanen et al. | |
| 2004/0203727 A1 | 10/2004 | Abiri et al. | |
| 2004/0203811 A1 * | 10/2004 | Rudowicz | 455/450 |
| 2005/0130645 A1 | 6/2005 | Dobson et al. | |
| 2006/0002323 A1 * | 1/2006 | Hildebrand et al. | 370/321 |
| 2006/0052124 A1 * | 3/2006 | Pottenger et al. | 455/515 |
| 2007/0041361 A1 * | 2/2007 | Iso-Sipila | 370/352 |

* cited by examiner

*Primary Examiner* — Huy D Vu
*Assistant Examiner* — Brandon Renner
(74) *Attorney, Agent, or Firm* — McAndrews, Held & Malloy, Ltd.

(57) ABSTRACT

Using a single logical base transceiver to serve multiple physical locations is disclosed. A call traffic associated with a call associated at a mobile network with an assigned timeslot of a logical base transceiver is received. A timeslot with which the call traffic is associated is remapped from the assigned timeslot to a serving timeslot being used at a serving physical base transceiver to facilitate the call, in the event the call traffic comprises inbound call traffic being sent into the mobile network from the serving physical base transceiver, or from the serving timeslot to the assigned timeslot in the event the call traffic comprises outbound call traffic being sent from the mobile network to the serving physical base transceiver.

19 Claims, 15 Drawing Sheets

USING A SINGLE LOGICAL BASE TRANSCEIVER TO SERVE MULTIPLE PHYSICAL LOCATIONS

CROSS REFERENCE TO OTHER APPLICATIONS

This application claims priority to U.S. Provisional Patent Application No. 60/838,550 entitled USING A SINGLE LOGICAL BASE TRANSCEIVER TO SERVE MULTIPLE PHYSICAL LOCATIONS filed Aug. 17, 2006, which is incorporated herein by reference for all purposes.

BACKGROUND OF THE INVENTION

Traditional base transceiver stations (BTS) are large, immobile installations configured to provide mobile telecommunication service to users in a relatively large surrounding geographic area or "cell". A traditional BTS typically includes multiple transceivers (TRX), each operating at an assigned frequency and in the case of a GSM installation. In the case of GSM, time division multiple access (TDMA) is used to enable a single TRX to be used to transmit/receive on eight timeslots, each timeslot capable of carrying traffic for a corresponding signaling or traffic channel.

A traditional BTS typically provides connectivity to a public land mobile network (PLMN) via a dedicated wired connection, e.g., a T-1 or E-1 line, to a base station controller (BSC). The BSC typically provides such connectivity for a plurality of base transceiver stations. Typically, a BSC is limited to supporting up to a certain maximum number of base transceiver stations (BTS) and a corresponding and typically larger maximum number of transceivers (TRX). For example, a BSC may be able to support up to a maximum of 300 BTS's and up to 900 TRX's. To fully utilize the capacity of such a BSC, each BTS would have to include on average three TRX's.

Small scale base transceiver stations (sometimes referred to herein by the acronym "S-BTS"), such as a micro-, pico-, or femto-base transceiver stations (micro-, pico-, or femto-BTS), have been developed to provide relatively low volume mobile telecommunications service to specific areas and/or users (e.g., a residence, a business, and/or a remote area). A small scale BTS may not need anywhere near the call capacity of a traditional BTS. For a small scale BTS deployed to serve a single residence, for example, utilization may be such that only a single TRX, or even fewer timeslots than a single TRX would provide may be needed. As a result, deploying numerous small scale BTS's in a service area served by a typical single BSC, each with only one (or fewer) TRX, might result in underutilization of the BSC's resources. For example, in the example described above the BSC is configured to support a maximum of 300 BTS's and 900 TRX's. If each of the 300 BTS's were an S-BTS having only one TRX, then the BSC would support only 300 TRX's, leaving the BSC's ability to support 600 more TRX's unused.

BRIEF DESCRIPTION OF THE DRAWINGS

Various embodiments of the invention are disclosed in the following detailed description and the accompanying drawings.

DETAILED DESCRIPTION

Figure 1:
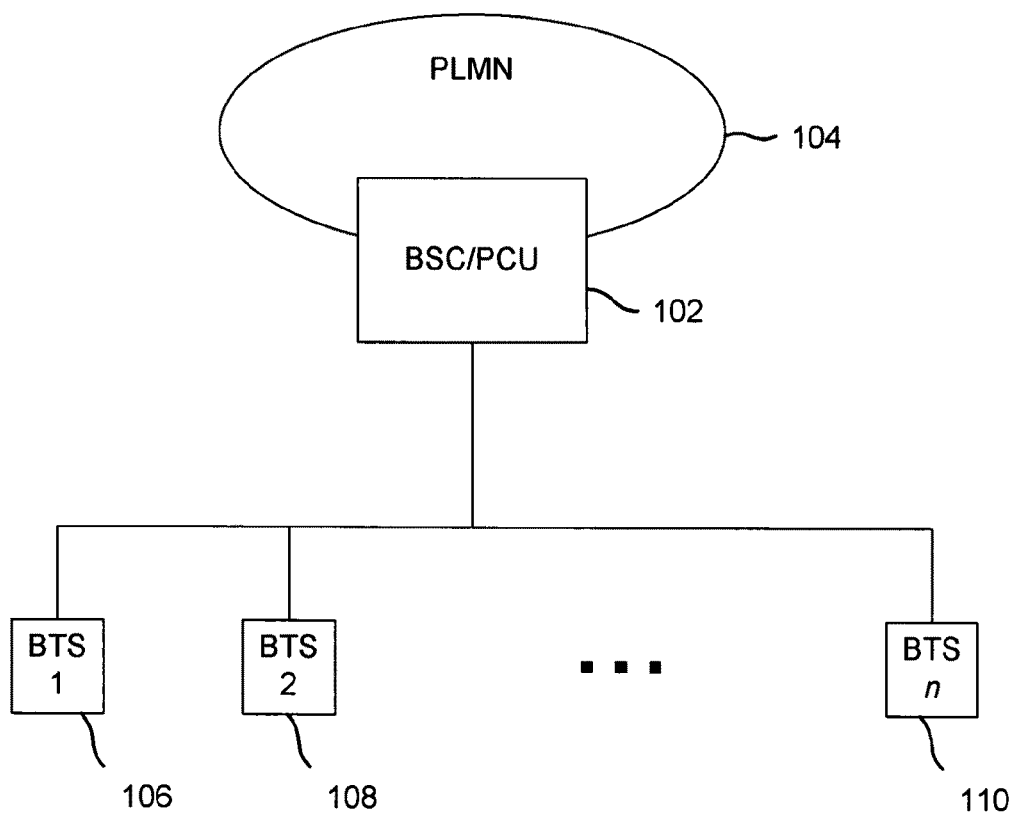
FIG. 1 is a block diagram illustrating an embodiment of elements of a mobile telecommunications network.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a single logical base station and/or transceiver to be used to provide mobile telecommunication service via a plurality of physical base stations and/or transceivers is disclosed. In some embodiments, a single logical base transceiver station (BTS) and/or transceiver (TRX) from the perspective of the mobile network is used to provide service via multiple small scale base transceiver stations (S-BTS), each potentially in a different geographic location. In some embodiments, timeslot remapping is employed to enable a call associated from the perspective of a mobile network (e.g., PLMN) with a particular BSC, TRX, and/or timeslot thereof to be connected and provided via an S-BTS, e.g., via a particular timeslot of a single physical TRX of the S-BTS. Outgoing traffic associated from the perspective of the mobile network with a timeslot of a logical BTS and/or associated TRX is remapped to a timeslot with which the call is associated at the S-BTS via which the call is being provided, i.e., the timeslot actually being used at the servicing S-BTS to send/receive to/from the mobile station (MS) call data associated with the call. Likewise, incoming traffic received from the S-BTS is remapped to the logical BSC and/or TRX timeslot with which the call is associated at the mobile network (e.g., BSC). In some embodiments, frequency remapping is used to enable a logical BSC and/or TRX to be used to provide mobile telecommunication service via a plurality of small scale base transceiver stations. In some embodiments, each S-BTS has a single transceiver with a same number of timeslots as one or more logical transceivers from the perspective of the mobile network, each transceiver having associated with it a corresponding transmit frequency. An S-BTS via which a call is connected is configured to operate, on a same timeslot as a logical TRX timeslot with which the call is associated at the mobile network, at a frequency associated with a logical TRX with which the call is associated at the mobile network.

FIG. 1 is a block diagram illustrating an embodiment of elements of a mobile telecommunications network. A base station controller/packet control unit 102 provides access to a public land mobile network (PLMN) 104 to mobile stations (MS) present within the respective coverage area of one or more of a plurality of n base transceiver stations (BTS), represented in FIG. 1 by BTS's 106, 108, and 110. Each BTS is connected to the BSC 102 via a dedicated T-1, E-1, or similar connection.

Figure 2:
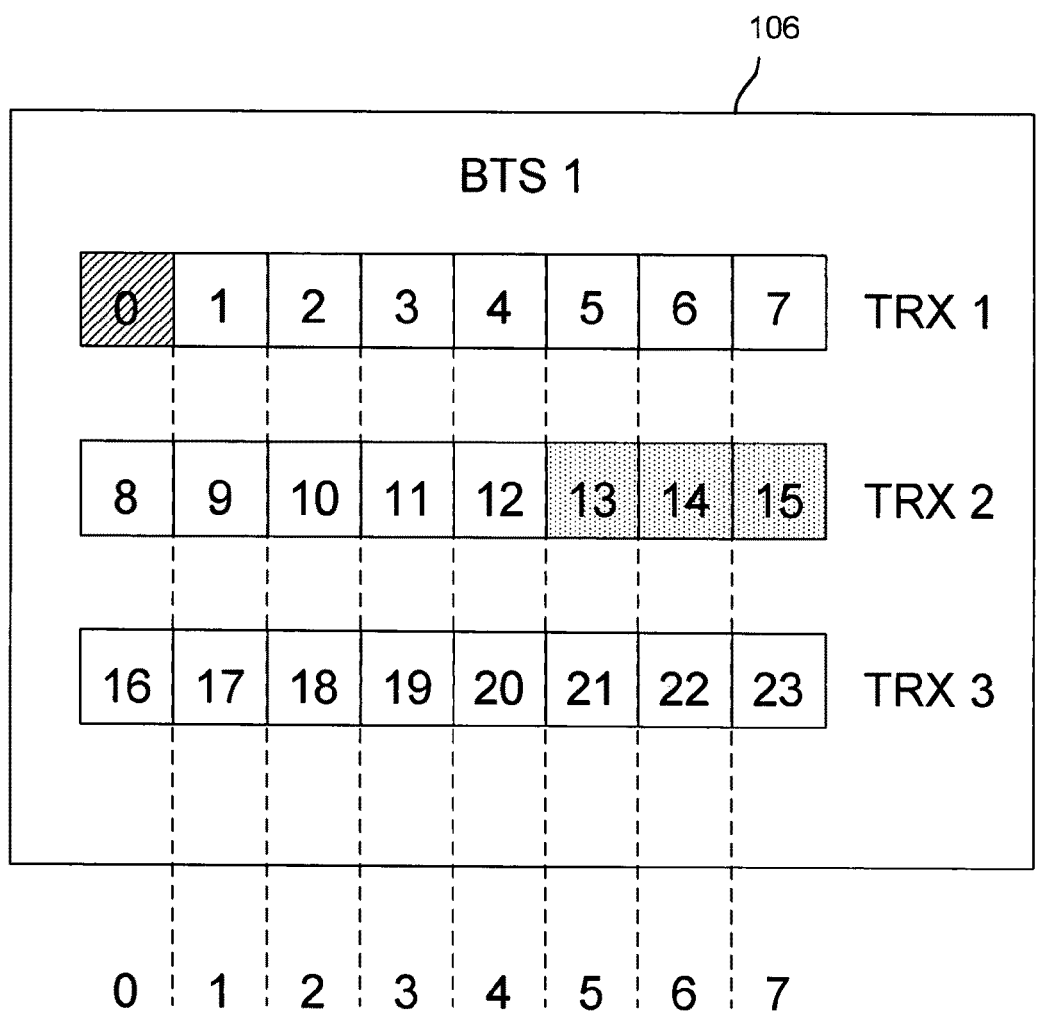
FIG. 2 is a block diagram illustrating an embodiment of a set of transceivers (TRX) comprising a base transceiver station (BTS).

FIG. 2 is a block diagram illustrating an embodiment of a set of transceivers (TRX) comprising a base transceiver station (BTS). In the example shown, BTS 106 comprises three transceivers, TRX 1, TRX 2, and TRX 3, each having eight timeslots. For convenience and clarity in the discussion below, the combined 24 timeslots of the three TRX's comprising BTS 106 in this example have been numbered consecutively as timeslots 0-23. In the example shown, timeslot 0 is cross-hatched to indicate it has been assigned to carry messages associated with the broadcast or beacon channel (BCCH) for the BTS 106. Only one timeslot on one transceiver need carry the BCCH traffic in a traditional BTS, since that is sufficient to enable MS's within a coverage area of the BTS to receive the BCCH transmissions. In this example, timeslots 13, 14, and 15 (i.e., timeslots 5-7 of TRX 2) have been designated to handle all packet data traffic (packet data channels or PDCH) sent/received via the BTS. The remaining twenty timeslots, 1-12 and 16-23 in this example, would be available to be assigned to serve as traffic channels (TCH), each for a corresponding call, for example.

Figure 3:
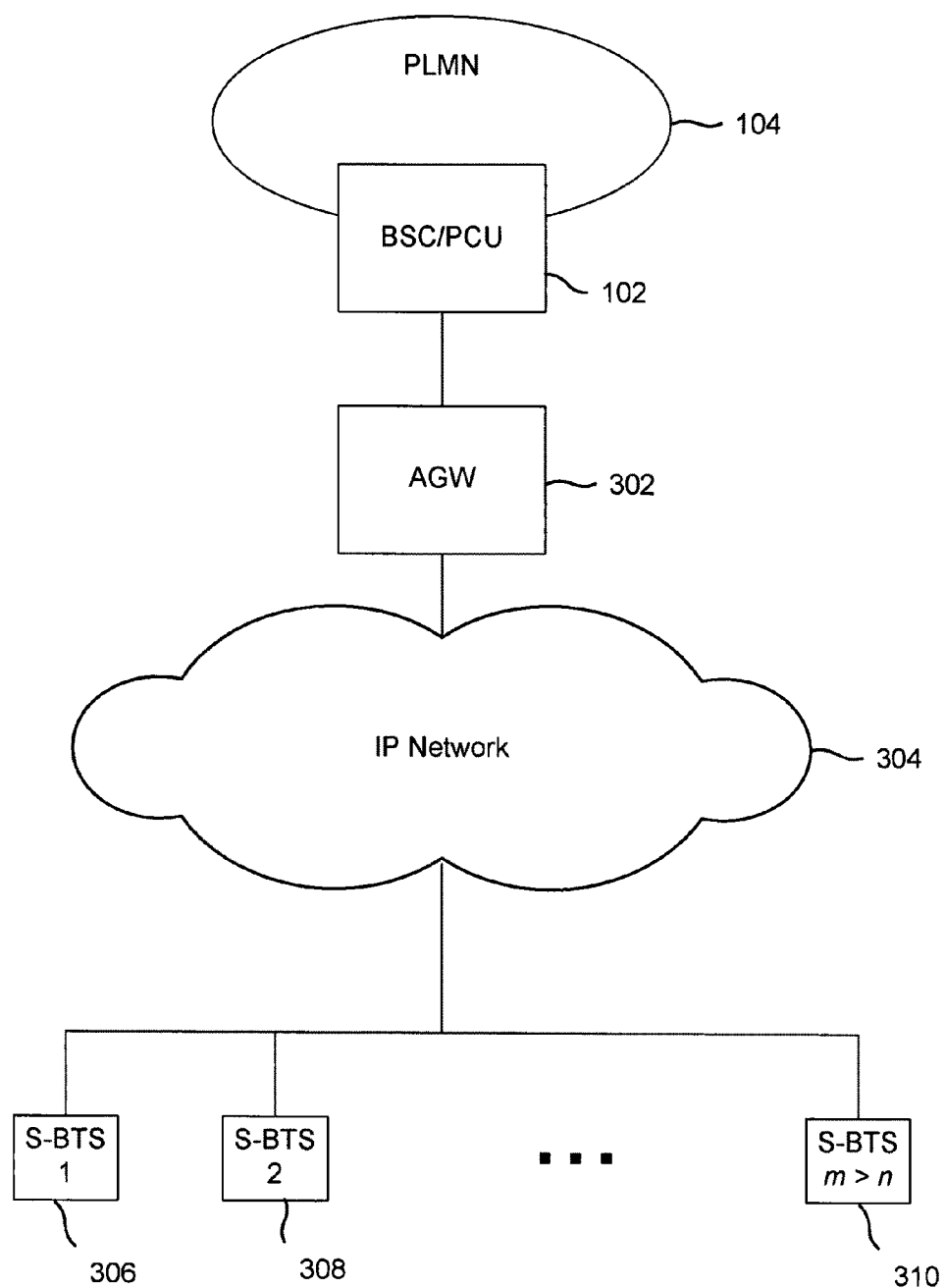
FIG. 3 is a block diagram illustrating an embodiment of a system for using a single logical BTS to provide mobile telecommunication service via a plurality of physical base transceiver stations.

FIG. 3 is a block diagram illustrating an embodiment of a system for using a single logical BTS to provide mobile telecommunication service via a plurality of physical base transceiver stations. In the example shown, an aggregating gateway (AGW) 302 is connected via an IP network 304, e.g., the Internet, to a plurality of small scale base transceiver stations (S-BTS), represented in FIG. 3 by S-BTS's 306, 308, 310. The AGW 302 provides connectivity to PLMN 104 via BSC 102. In the example shown, the number of small scale base transceiver stations m is greater than a maximum number n of BTS's that the BSC is configured and/or capable of being provisioned to support. In some embodiments, each S-BTS has a single transceiver, such that the total number of transceivers (TRX) m is less than a maximum number of TRX's that the BSC 102 is able to support. Using timeslot remapping to enable the m physical S-BTS's and/or associated TRX's to be served using n<m or fewer logical BTS's from the perspective of BSC 102 is disclosed. For example, in some embodiments the three TRX's illustrated in FIG. 2 as being associated with a traditional large scale BTS 106 would represent a single logical BTS and associated logical TRX timeslots 0-23. Each call associated from the perspective of BSC 102 with an assigned one of the logical TRX timeslots 0-23 would in practice be remapped to a corresponding timeslot on a physical TRX of an S-BTS via which the call is being provided, i.e., the actual timeslot via with the S-BTS sends/receives data associated with the call.

Figure 4:
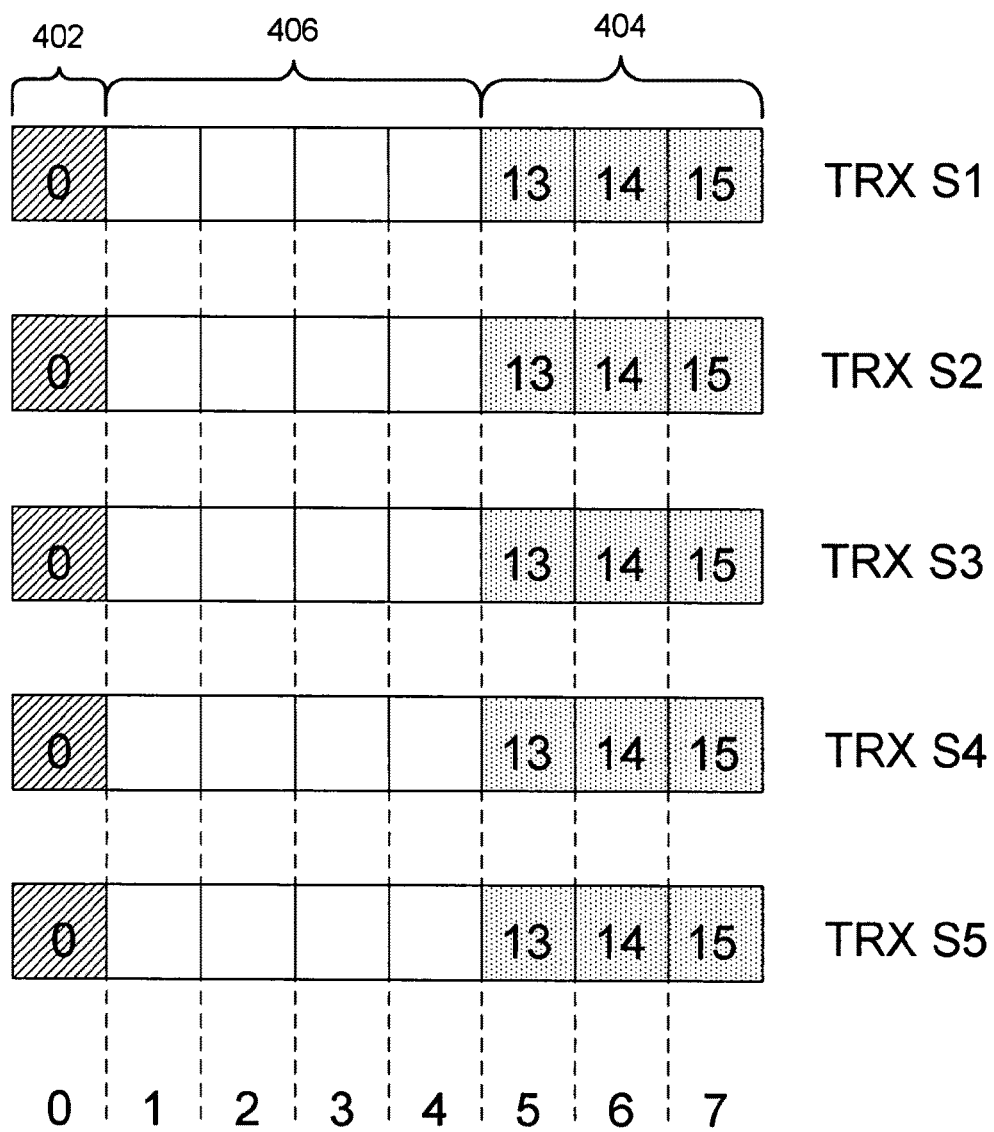
FIG. 4 is a block diagram illustrating an embodiment of timeslot remapping.

FIG. 4 is a block diagram illustrating an embodiment of timeslot remapping. In the example shown, the single logical BTS 106 and associated logical TRX's of FIG. 2 are used to provide mobile telecommunication services via a set of five S-BTS's, each having a corresponding TRX as shown in FIG. 4 (TRX's S1-S5). In the example shown, the broadcast control channel (BCCH) associated with logical timeslot 0 of BTS 106 is propagate to the respective first timeslot (402) of each of the five S-BTS's. The packet data channels (PDCH) assigned to logical timeslots 13-15 are remapped to the sixth through eighth timeslots of each S-BTS TRX (404). The remaining twenty timeslots (406) are available to serve as call traffic channels (TCH). In some embodiments, as a call is set up, the AGW 302 or another node observes the logical timeslot to which the call is assigned and establishes a mapping between that logical timeslot and a physical TRX timeslot that will be used to send/receive traffic associated with the call via an air link to a participating MS being serviced via an S-BTS with which the physical TRX is associated. Illustrative examples of such remapping are described further below.

The numbers of S-BTS's and TRX's used in the embodiments described herein are merely illustrative examples, and in general the techniques disclosed herein can be used to provide service between any number m of physical BTS's using a fewer (e.g., maximum) number of n logical BTS's from the perspective of the BSC or other mobile network node. For example, if the BTS 106 of FIG. 2 comprised a maximum of four TRX's, such that an additional eight logical timeslots were available, in the approach illustrated in FIG. 4 an additional two S-BTS's and associated TRX's could be supported, to make full use of the maximum 28 TCH's. Likewise, if the BTS 106 were limited to two TRX's, eight fewer TCH timeslots would be available, such that only three S-BTS's and associated TRX's could be supported.

Figure 5:
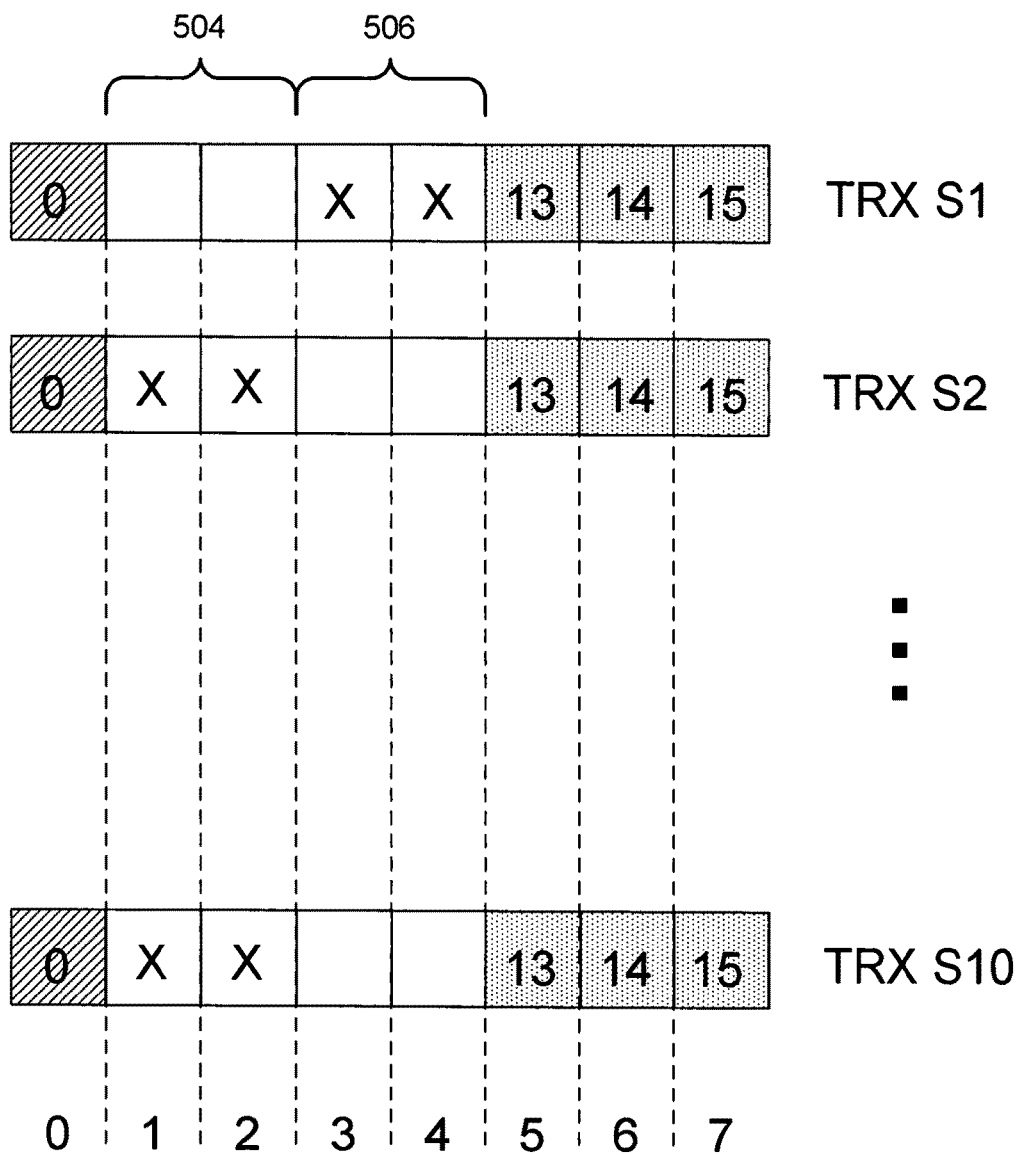
FIG. 5 is a block diagram illustrating an embodiment of a set of base stations in which a logical TRX is to support multiple physical TRX's, each having fewer than a full (e.g., eight) number of usable timeslots.

FIG. 5 is a block diagram illustrating an embodiment of a set of base stations in which a logical TRX is to support multiple physical TRX's, each having fewer than a full (e.g., eight) number of usable timeslots. In this example, each S-BTS and associated TRX is limited to handling calls on two timeslots at a time, with the two remaining timeslots, i.e., those not available to handle call traffic (TCH) and not used for the BCCH or PDCH (indicated by "X" marks in FIG. 5), going unused. In the example shown in FIG. 5, physical TRX's are assigned usable timeslots in pairs across which the usable timeslots of a single full TRX are spread, such that each comprises a "sub" TRX or "sub-TRX". For example, TRX S1 is shown as having timeslots 1 and 2 (504) available for use to handle call traffic (TCH) while TRX S2 has timeslots 3 and 4 (506) available, and so on through TRX S10. By so limiting the capacity of each S-BTS and associated TRX, a total of ten small scale base transceivers, each having a single TRX and each capable of supporting up to two traffic channels (TCH) at a time, can be provided using a single logical BTS from the perspective of the BSC.

Figure 6:
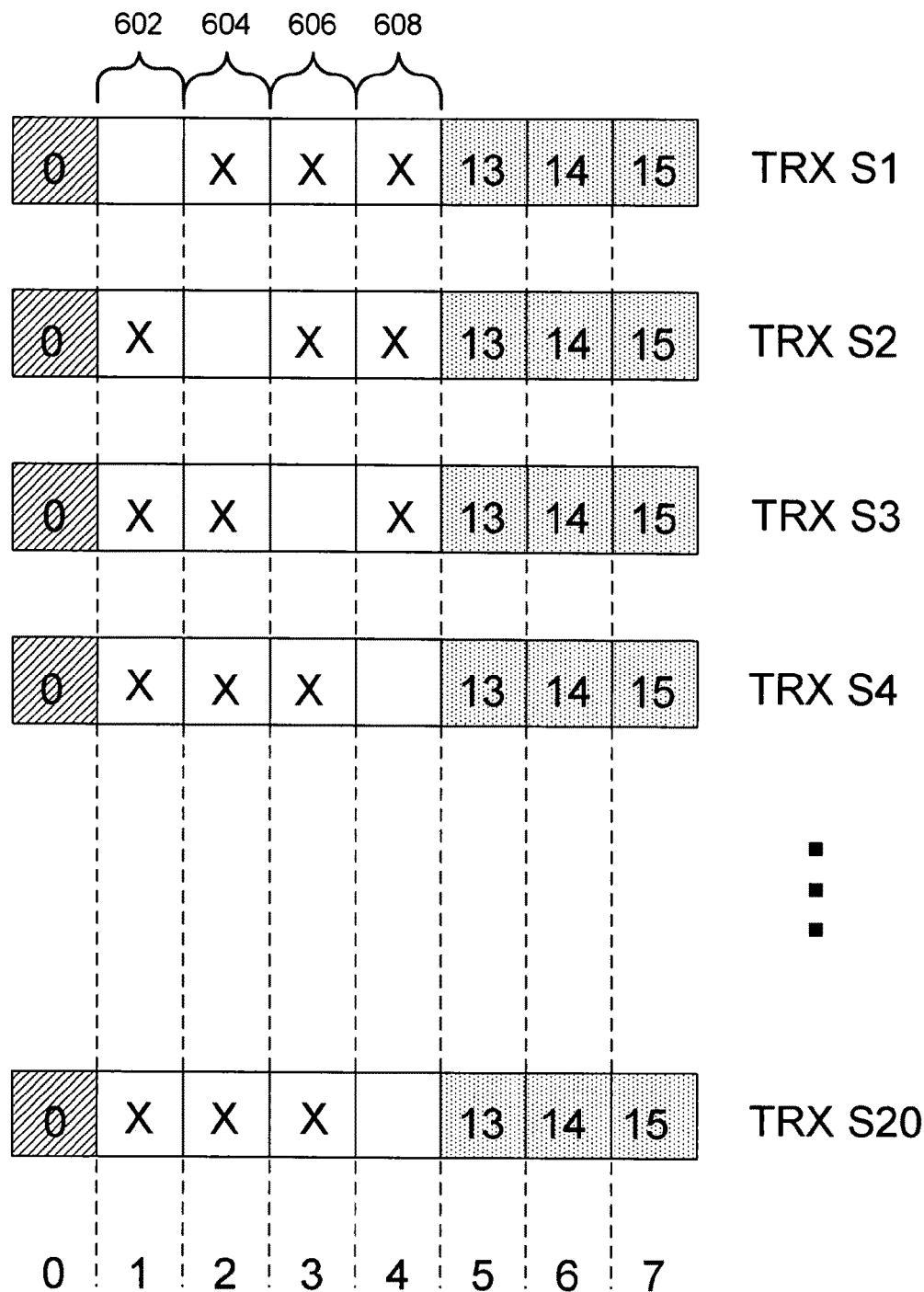
FIG. 6 is a block diagram illustrating an embodiment of a set of base stations in which a logical TRX is to support multiple physical TRX's, each having fewer than a full (e.g., eight) number of usable timeslots.

FIG. 6 is a block diagram illustrating an embodiment of a set of base stations in which a logical TRX is to support multiple physical TRX's, each having fewer than a full (e.g., eight) number of usable timeslots. In this example, each S-BTS and associated TRX is limited to handling calls on a single timeslot, with the three remaining timeslots going unused. For example, each of TRX's S1 through S4 has a single timeslot, timeslots 1-4 (602-608) respectively, available to handle call traffic (TCH). By so limiting the capacity of each S-BTS and associated TRX, a total of twenty small scale base transceivers, each having a single TRX and each capable of supporting a single traffic channel (TCH), can be provided using a single logical BTS from the perspective of the BSC.

Figure 7:
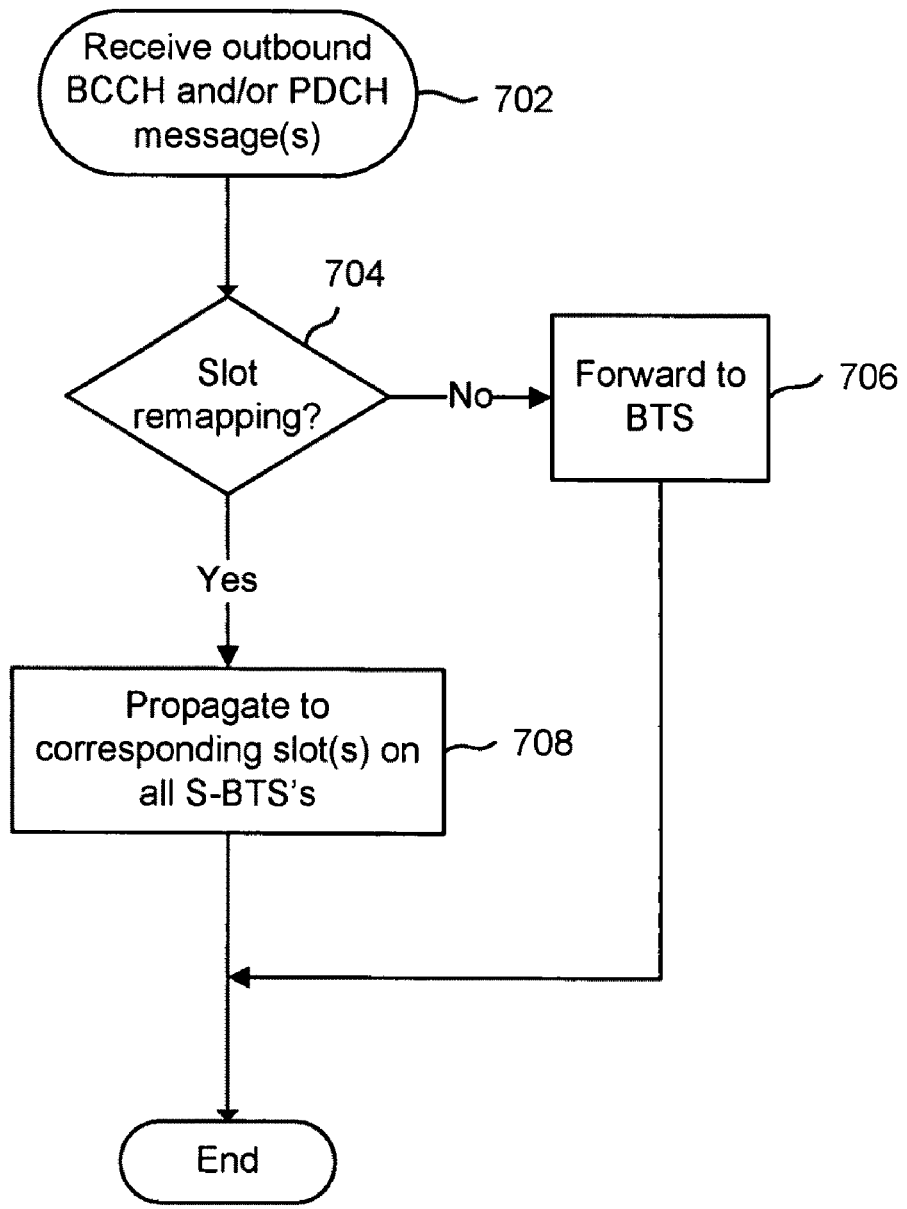
FIG. 7 is a flow chart illustrating an embodiment of a process for using a single logical BTS to provide mobile service via a plurality of physical BTS's.

FIG. 7 is a flow chart illustrating an embodiment of a process for using a single logical BTS to provide mobile service via a plurality of physical BTS's. In some embodiments the process of FIG. 7 is implemented on an aggregation node, such as AGW 302 of FIG. 3. In the example shown, as outbound (i.e., from the mobile network for transmission by BTS's) BCCH and/or PDCH messages are received (702), they are forwarded to a corresponding BTS if timeslot remapping is not being performed (704, 706). If timeslot remapping is being performed (704), e.g., to enable a single logical BTS with which the received traffic is associated to be used to provide service via a plurality of physical BTS's, then the received traffic is propagate to each of a plurality of such physical BTS's (708), for transmission by each on a corresponding timeslot(s) as applicable. For example, in the example shown in FIG. 4, a received BCCH message associated at the BSC with logical timeslot 0 of BTS 106 would be propagated to each of the five S-BTS's shown in FIG. 4, for transmission by each on its associated physical timeslot 0.

Figure 8:
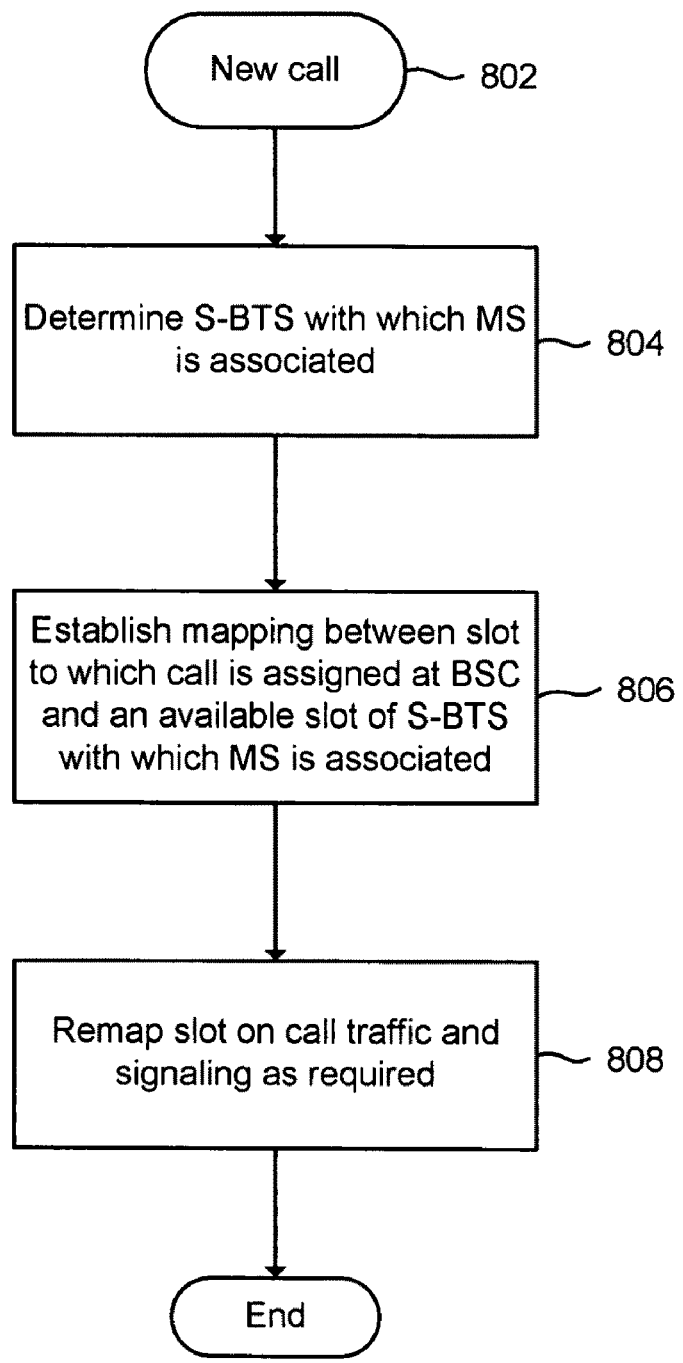
FIG. 8 is a flow chart illustrating an embodiment of a process for using a single logical BTS to provide mobile service via a plurality of physical BTS's.

FIG. 8 is a flow chart illustrating an embodiment of a process for using a single logical BTS to provide mobile service via a plurality of physical BTS's. In some embodiments the process of FIG. 8 is implemented on an aggregation node, such as AGW 302 of FIG. 3. In the example shown, when a new call is set up (802) the physical BTS (e.g., S-BTS) with which the call is associated is determined (804), for example the S-BTS via which a participating MS is being provided service; and a mapping between a logical timeslot to which the call is assigned, e.g., by the BSC, and a physical timeslot on the serving S-BTS is established (806). Subsequently received call traffic is remapped, per the mapping, as required (808), such that call traffic as seen by the BSC is associated with the assigned logical timeslot and as seen by the S-BTS is associated with the physical timeslot being used to service the call.

Figure 9:
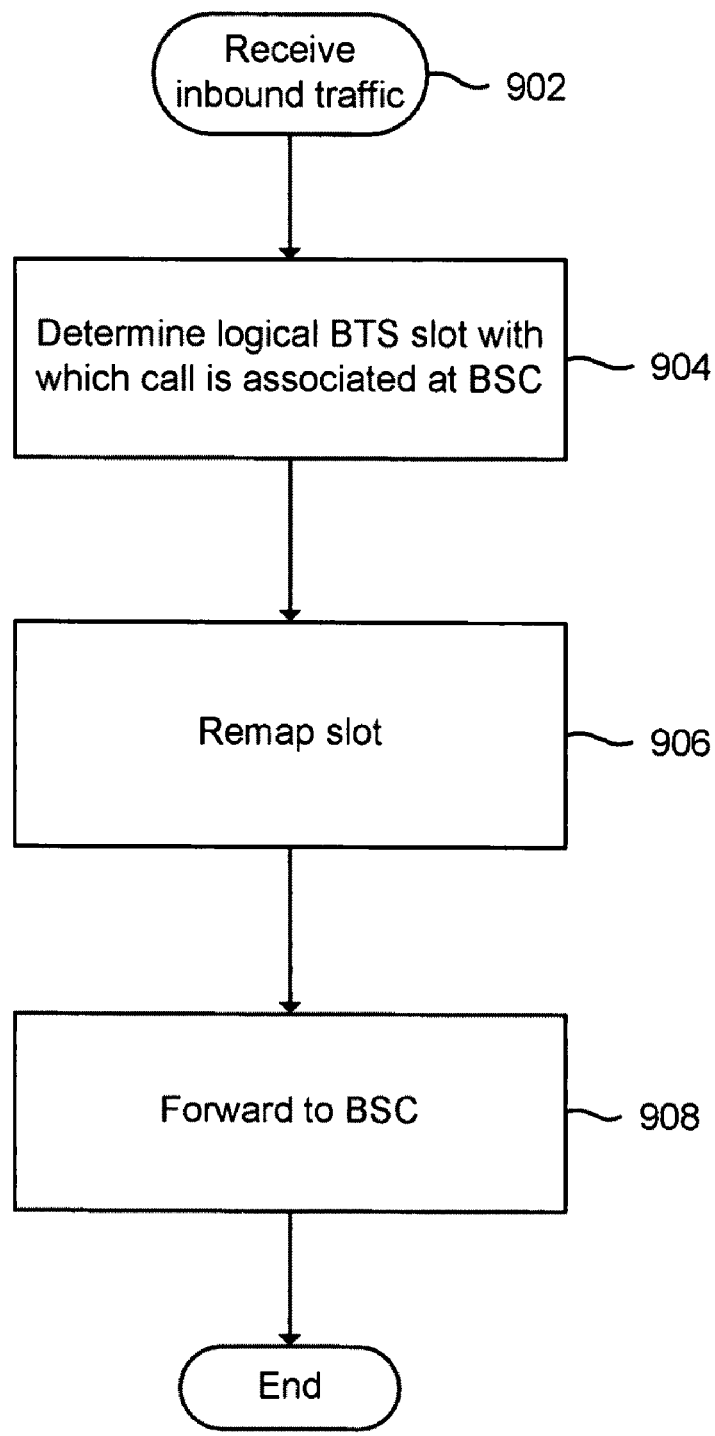
FIG. 9 is a flow chart illustrating an embodiment of a process for handling inbound call traffic.

FIG. 9 is a flow chart illustrating an embodiment of a process for handling inbound call traffic. In some embodiments, the process of FIG. 9 is used to implement 808 of FIG. 8 with respect to inbound call traffic, i.e., traffic received from the serving S-BTS and intended to be sent into the mobile network (e.g., PLMN) via a serving BSC. In some embodiments the process of FIG. 9 is implemented on an aggregation node, such as AGW 302 of FIG. 3. As inbound traffic is received from the serving S-BTS (902), the logical timeslot with which the call is associated at the BSC is determined (904) and the timeslot is remapped (906) to that logical timeslot prior to the traffic being forwarded to the BSC (908).

Figure 10:
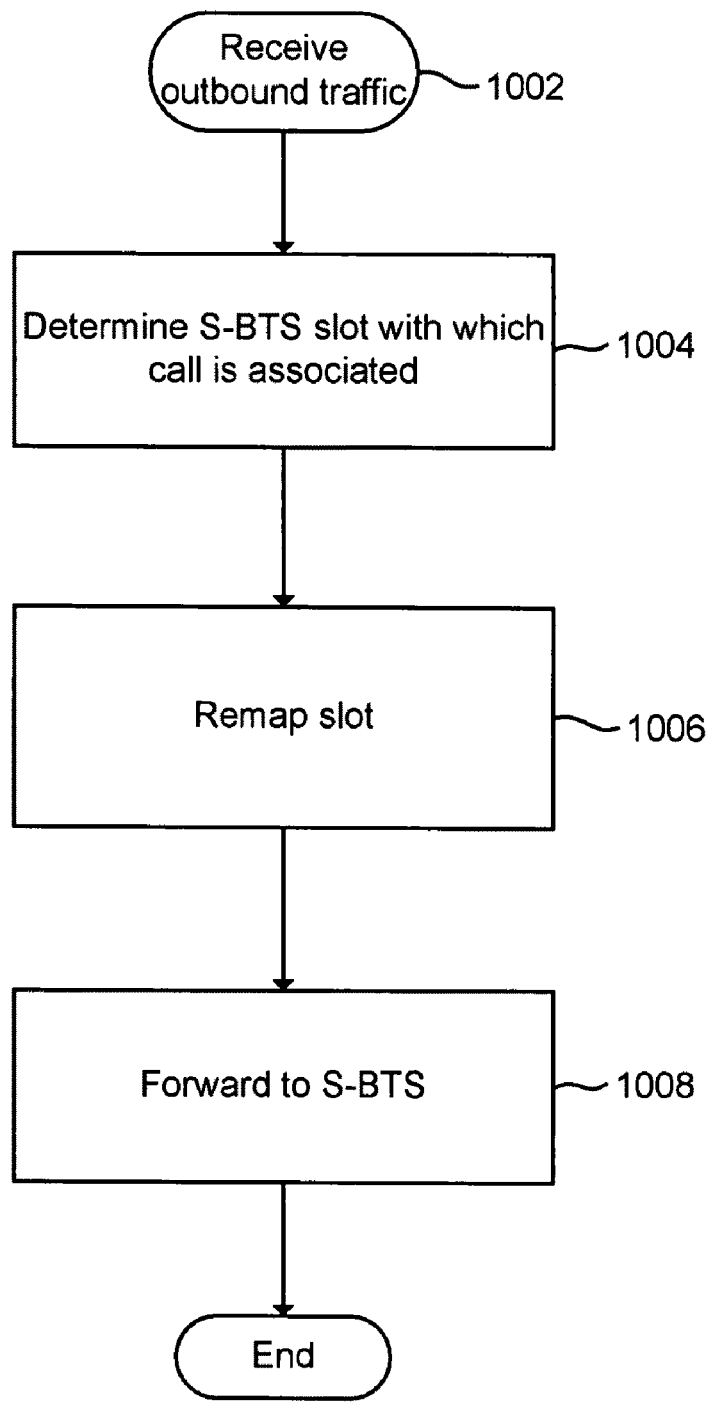
FIG. 10 is a flow chart illustrating an embodiment of a process for handling outbound call traffic.

FIG. 10 is a flow chart illustrating an embodiment of a process for handling outbound call traffic. In some embodiments, the process of FIG. 10 is used to implement 808 of FIG. 8 with respect to outbound call traffic, i.e., traffic received at a serving BSC, from the mobile network (e.g., PLMN), and intended to be sent to a serving S-BTS for transmission to a participating MS. In some embodiments the process of FIG. 9 is implemented on an aggregation node, such as AGW 302 of FIG. 3. As outbound traffic is received (1002), e.g., from the BSC, the serving S-BTS and the timeslot that is being used on that S-BTS to service the call are determined (1004) and the traffic is remapped to that S-BTS timeslot (1006) prior to the traffic being forwarded to the serving S-BTS (1008).

Figure 11:
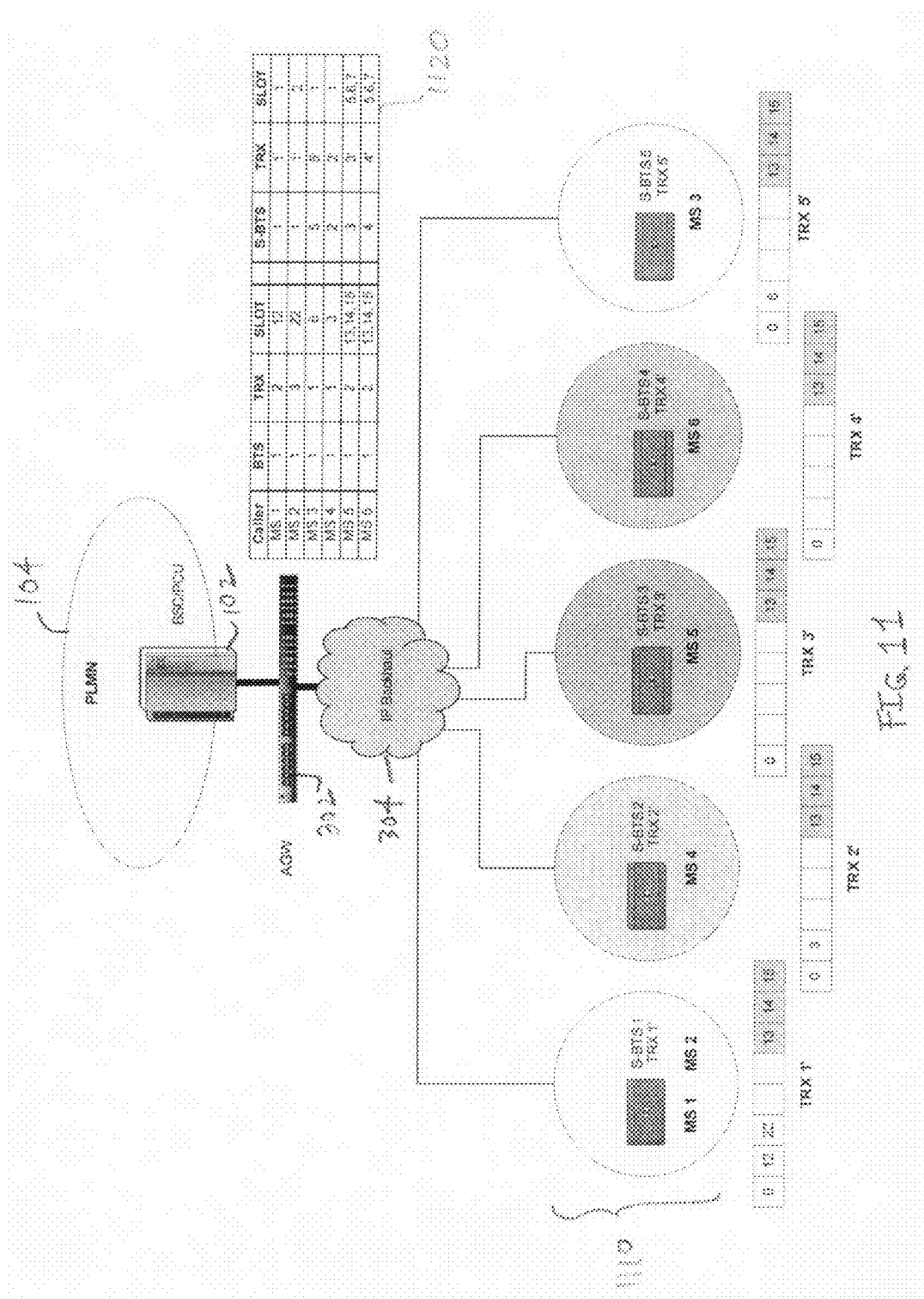
FIG. 11 is a block diagram illustrating an embodiment of a system for using a single logical BTS to provide mobile service via a plurality of physical BTS's.

FIG. 11 is a block diagram illustrating an embodiment of a system for using a single logical BTS to provide mobile service via a plurality of physical BTS's. In the example shown, a single logical BTS having three logical TRX's associated with it is used to provide mobile services via a plurality of five physical small scale BTS's (1110), denoted S-BTS 1 through S-BTS 5, each having a single physical TRX associated with it. In the example shown, the BCCH on logical timeslot 0 is propagated to the respective timeslot 0 of each of the five S-BTS's and the PDCH channels on logical timeslots 13-15 are propagated to the respective timeslots 5-7 of each of the five S-BTS's. Each of the remaining four timeslots on each S-BTS are available to be mapped dynamically to a logical timeslot of the logical BTS, e.g., to provide a traffic channel (TCH) to handle call traffic. In the example shown, mobile stations MS 1 and MS 2 have calls associated at the BSC with logical timeslots 12 and 22 respectively (i.e., timeslot 4 of logical TRX 2 and timeslot 6 of logical TRX 3, respectively, see FIG. 2), which logical timeslots have been remapped to timeslots 1 and 2, respectively, of TRX 1' of S-BTS 1, as shown in table 1120 and the timeslot map for TRX 1', shown below S-BTS 1. Likewise, each of mobile stations MS 3 and MS 4 is participating in a call via a serving S-BTS, with the logical timeslots assigned at the BSC being mapped to corresponding S-BTS timeslots as shown in table 1120 and in the timeslot maps shown below S-BTS 5 and S-BTS 2, respectively. Finally, MS 5 and MS 6 are participating, via S-BTS 3 and S-BTS 4, respectively, in packet data communications via the packet data channels provided via logical timeslots 13, 14, and 15, propagated in this example to timeslots 5-7 of each of the S-BTS's, include S-BTS's 3 and 4 serving MS 5 and MS 6, respectively.

Figure 12:
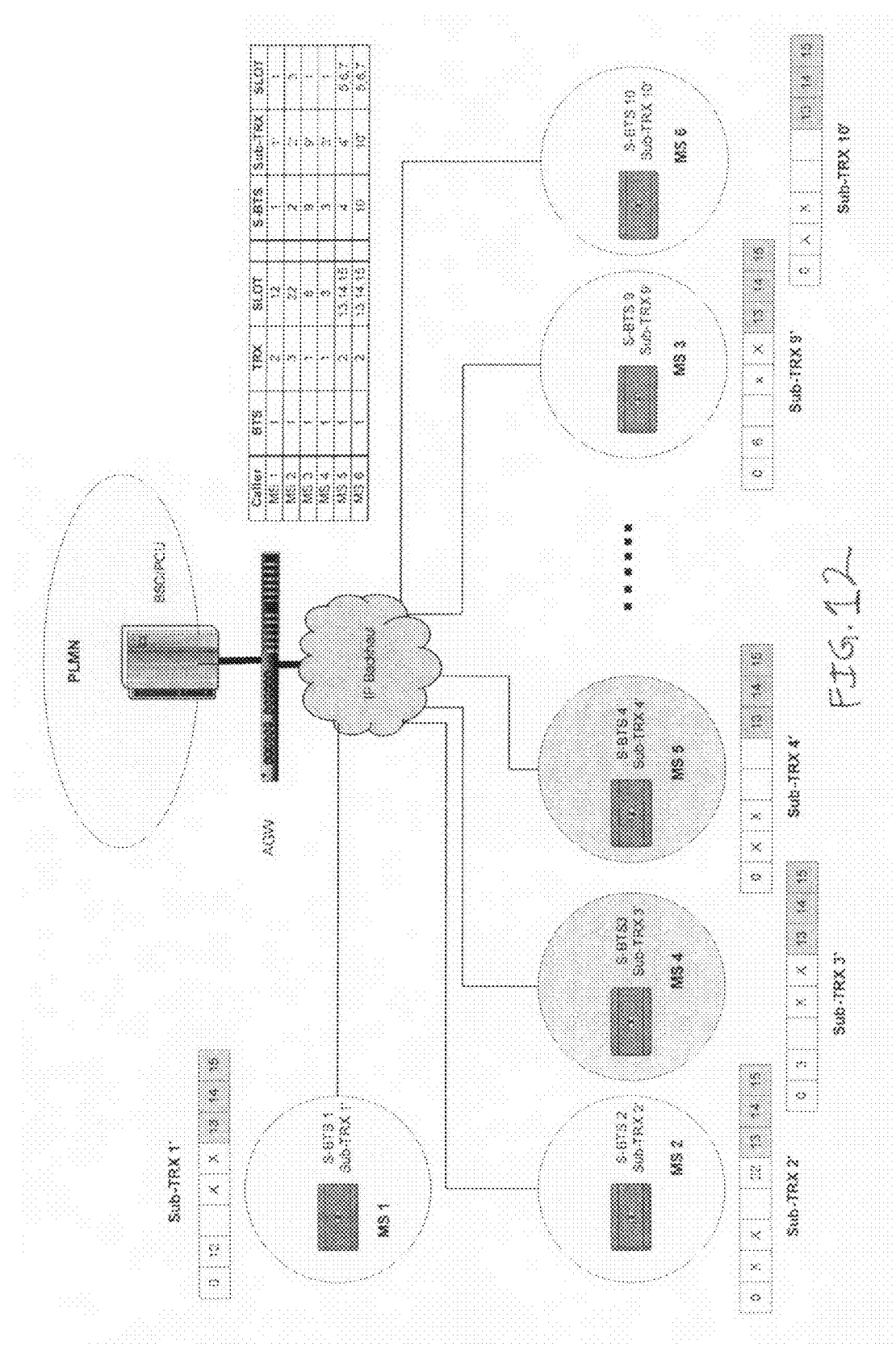
FIG. 12 is a block diagram illustrating an embodiment of a system for using a single logical BTS to provide mobile service via a plurality of physical BTS's.

FIG. 12 is a block diagram illustrating an embodiment of a system for using a single logical BTS to provide mobile service via a plurality of physical BTS's. In the example shown, each S-BTS is limited to using two timeslots for call traffic (TCH), enabling a total of ten S-BTS's to be supported using BSC resources associated with a single logical BTS having three logical TRX's associated with it at the BSC. As noted above, up to twenty S-BTS's could be supported by limiting each to a single TCH timeslot.

Using frequency hopping/remapping to enable resources associated with a single logical BTS to be used to provide service via multiple physical BTS's is disclosed. In some embodiments, each of a plurality of BTS's is configured to broadcast as required on a selected one of a plurality of frequencies, each associated with a corresponding logical TRX associated at a BSC or other mobile network node with a corresponding logical BTS. Calls serviced by a physical BTS, such as an S-BTS, are provided using the physical BTS timeslot corresponding to the logical TRX timeslot to which the call has been assigned, by configuring the physical BTS to operate on that timeslot at a frequency associated with the logical TRX to which the call has been assigned, e.g., at the BSC. For example, if there are three logical TRX's associated at the BSC with a logical BTS, such as BTS 106 of FIGS. 1 and 2, then in some embodiments each of a plurality of physical BTS's, e.g., S-BTS's, each having a single physical TRX, would be configured to operate as required, on each of a plurality of timeslots, at a selected one of three frequencies, each associated with a corresponding logical TRX. For example, a call assigned at the BSC to a timeslot 4 of a logical TRX 2 associated with an assigned frequency f2 would be serviced by a serving S-BTS via its timeslot 4 operating at the frequency f2. Likewise, a call being serviced by the same S-BTS but assigned at the BSC to a logical timeslot 5 of a logical TRX 3 associated with an assigned frequency f3 would be serviced by the S-BTS via its timeslot 5 but at the frequency f3.

Figure 13:
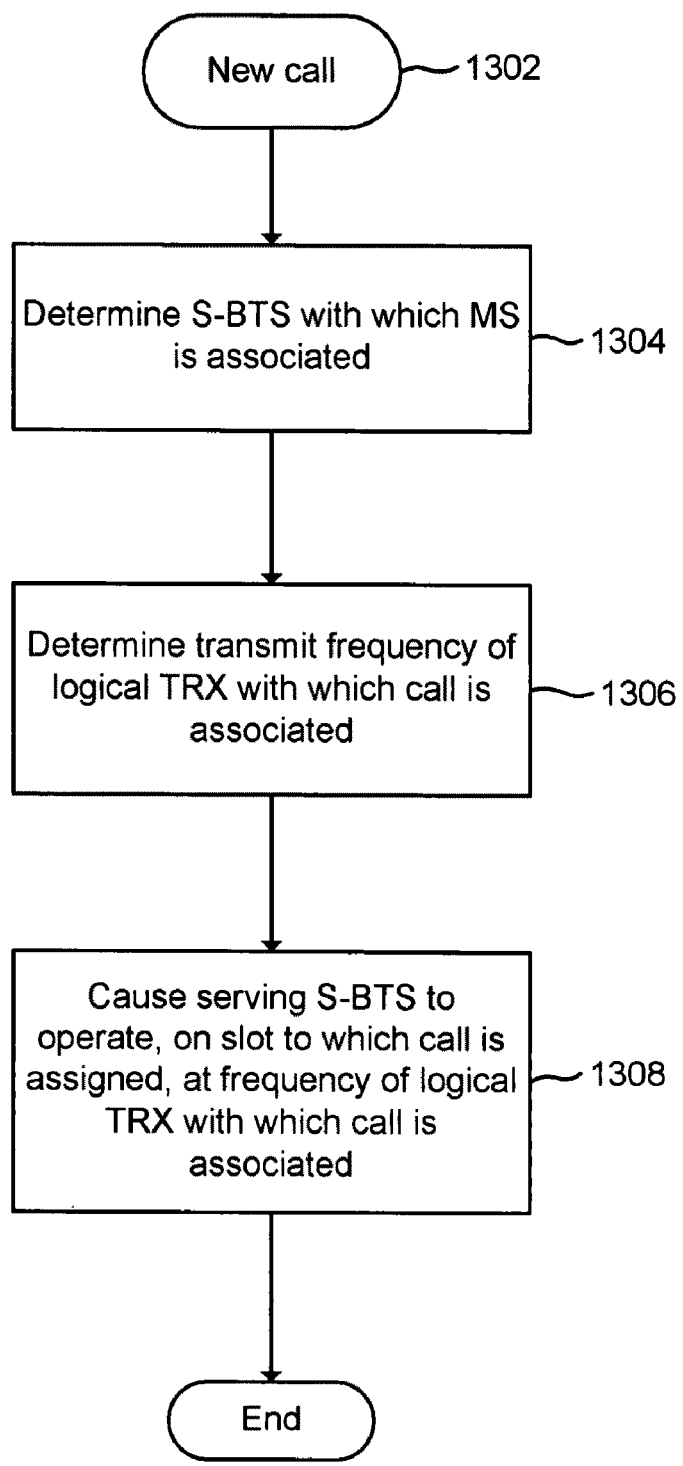
FIG. 13 is a flow chart illustrating an embodiment of a process for using frequency remapping to enable a single logical BTS to be used to provide mobile services via multiple physical BTS's.

FIG. 13 is a flow chart illustrating an embodiment of a process for using frequency remapping to enable a single logical BTS to be used to provide mobile services via multiple physical BTS's. In the example shown, when a call is setup (1302), the S-BTS via which the call will be provided (1304) and the transmit frequency of the logical TRX to which the call has been assigned (1306) are determined. The serving S-BTS is configured to use, on the timeslot to which the call has been assigned, the frequency associated with the logical TRX to which the call has been assigned (1308).

Figure 14:
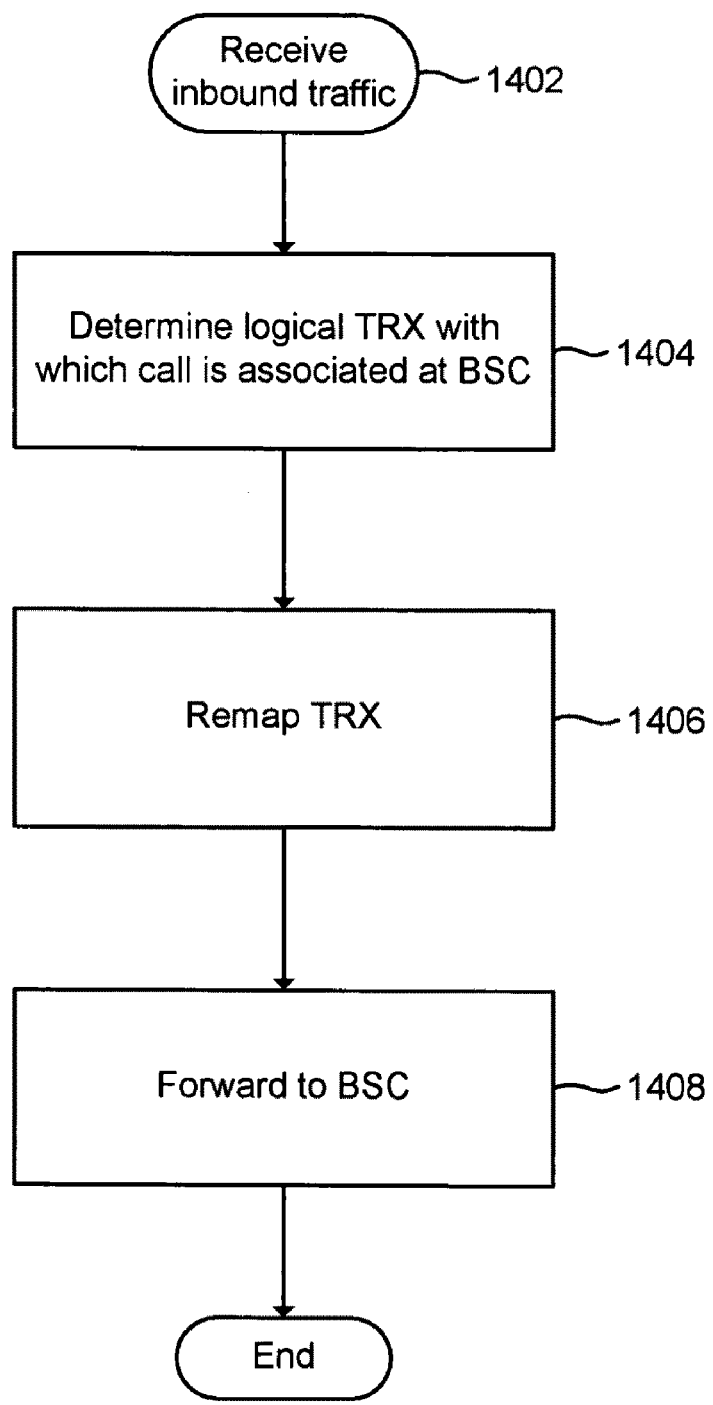
FIG. 14 is a flow chart illustrating an embodiment of a process for handling inbound call traffic in an environment in which frequency remapping is being used to enable a single logical BTS to be used to provide mobile services via multiple physical BTS's.

FIG. 14 is a flow chart illustrating an embodiment of a process for handling inbound call traffic in an environment in which frequency remapping is being used to enable a single logical BTS to be used to provide mobile services via multiple physical BTS's. In the example shown, as inbound traffic is received (1402) the logical TRX with which the call is associated at the BSC is determined (1404) and the call data is forwarded to the BSC in a manner that associates the call data with the logical TRX and timeslot to which the call is assigned (1406 and 1408).

Figure 15:
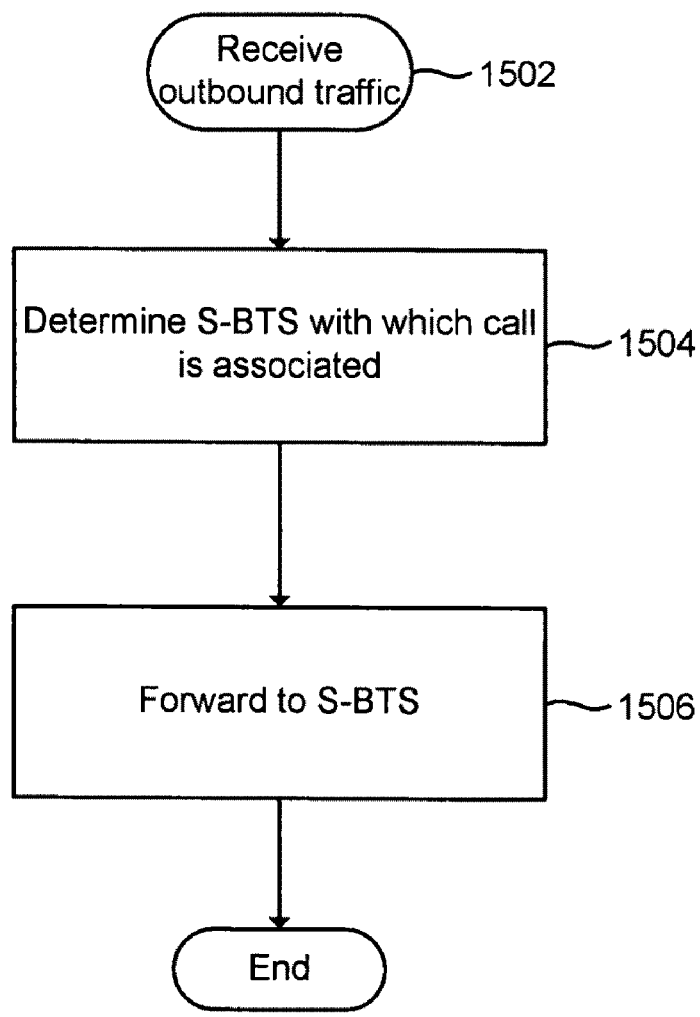
FIG. 15 is a flow chart illustrating an embodiment of a process for handling outbound call traffic in an environment in which frequency remapping is being used to enable a single logical BTS to be used to provide mobile services via multiple physical BTS's.

FIG. 15 is a flow chart illustrating an embodiment of a process for handling outbound call traffic in an environment in which frequency remapping is being used to enable a single logical BTS to be used to provide mobile services via multiple physical BTS's. In the example shown, as outbound traffic is received (1502), it is determined which S-BTS is servicing the call (1504) and the traffic is forwarded to the serving S-BTS (1506), which transmits the traffic at a frequency associated with a logical TRX with which the call is associated at the BSC.

In some embodiments, using frequency remapping/hopping in some embodiments requires less management of call state and other data and less alteration of call traffic than the timeslot remapping approach described above.

In some embodiments, a method of providing telecommunication service is described. The method may include, for example, receiving a call traffic associated with a call associated at a mobile network with an assigned timeslot of a logical base transceiver. The method may also include, for example, remapping a timeslot with which the call traffic is associated from the assigned timeslot to a serving timeslot being used at a serving physical base transceiver to facilitate the call, in the event the call traffic comprises inbound call traffic being sent into the mobile network from the serving physical base transceiver, or from the serving timeslot to the assigned timeslot in the event the call traffic comprises outbound call traffic being sent from the mobile network to the serving physical base transceiver. The method may include, for example, receiving an indication that the call is being set up and assigned to the assigned timeslot. The method may also include, for example, storing a mapping data that associates the assigned timeslot with the serving timeslot. The mapping data may be used, for example, to remap the timeslot.

In some embodiments, a method of providing telecommunication service is described. The method may include, for example, receiving an indication that a call to be provided via a serving physical base transceiver is associated at a mobile network with an assigned timeslot of a logical base transceiver. The method may also include, for example, configuring the serving physical base transceiver to operate with respect to a serving timeslot of the serving physical base transceiver, which serving timeslot corresponds to the assigned timeslot of the logical base transceiver, at a selected one of a plurality of frequencies at which the serving physical base transceiver is configured to operate with respect to the serving timeslot, the selected frequency corresponding to an assigned frequency associated at the mobile network with the logical base transceiver.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method of providing mobile telecommunication service, comprising:
receiving a call traffic associated with a call associated at a mobile network with an assigned timeslot of a logical base transceiver station, wherein the logical base transceiver station is seen as a single logical transceiver base station by a base station controller, wherein the logical base transceiver station represents a plurality of serving physical base transceiver stations, wherein the logical base transceiver station comprises a plurality of logical transceivers, wherein the plurality of logical transceivers have a pooled number of logical timeslots, wherein the pooled number of logical timeslots includes a single broadcast channel and a set number of assigned packet data channels;
remapping a timeslot with which the call traffic is associated from the assigned timeslot to a serving timeslot being used at a serving physical base transceiver station to facilitate the call, in the event the call traffic comprises inbound call traffic being sent into the mobile network from the serving physical base transceiver station, or from the serving timeslot to the assigned timeslot in the event the call traffic comprises outbound call traffic being sent from the mobile network to the serving physical base transceiver station, wherein each serving physi- cal base transceiver station has its own physical transceiver, each physical transceiver having its own serving timeslots;
remapping the broadcast channel of the logical base transceiver station to each broadcast channel of each serving physical base transceiver station;
remapping the assigned packet data channels of the logical base transceiver station to each set of packet data channels of each serving physical base transceiver station; and
remapping each traffic channel of the logical base transceiver station to one of traffic channels of the plurality of serving base transceiver stations.

2. The method according to claim 1, wherein the call capacity of the logical base transceiver station is enhanced at the expense of the call capacity of the serving base transceiver stations.

3. The method according to 1, wherein the call traffic comprises inbound call traffic received from the serving physical base transceiver station via an IP network.

4. The method according to claim 3, wherein the call traffic is received at an aggregation gateway (AGW).

5. The method according to claim 1, wherein the serving physical base transceiver station comprises a small scale base transceiver station (S-BTS).

6. The method according to claim 5, wherein the S-BTS is deployed to one or more of the following: a residence, a business, and a geographically remote or isolated area.

7. The method according to claim 1, further comprising receiving an indication that the call is being set up and assigned to the assigned timeslot.

8. The method according to claim 7, further comprising storing a mapping data that associates the assigned timeslot with the serving timeslot.

9. The method according to claim 8, wherein the mapping data is used to remap the timeslot.

10. The method according to claim 1, wherein remapping the timeslot comprises altering a timeslot identifier data included in the call traffic.

11. The method according to claim 1, further comprising propagating to a corresponding timeslot of each of a plurality if of physical base transceivers a broadcast control channel (BCCH) message associated with a broadcast control channel of the logical base transceiver.

12. The method according to claim 1, further comprising propagating to a corresponding timeslot of each of a plurality of physical base transceivers a packet data channel (PDCH) message associated with a packet data channel of the logical base transceiver.

13. A mobile telecommunication system, comprising:
a communication interface configured to receive a call traffic associated with a call associated at a mobile network with an assigned timeslot of a logical base transceiver station, wherein the logical base transceiver station is seen as a single logical transceiver base station by the base station controller, wherein the logical base transceiver station represents a plurality of serving physical base transceiver stations, wherein the logical base transceiver station comprises a plurality of logical transceivers, wherein the plurality of logical transceivers have a pooled number of logical timeslots, wherein the pooled number of logical timeslots includes a single broadcast channel and a set number of assigned packet data channels; and
a processor coupled to the communication interface and configured to remap a timeslot with which the call traffic is associated from the assigned timeslot to a serving timeslot being used at a serving physical base transceiver station to facilitate the call, in the event the call traffic comprises inbound call traffic being sent into the mobile network from the serving physical base transceiver station, or from the serving timeslot to the assigned timeslot in the event the call traffic comprises outbound call traffic being sent from the mobile network to the serving physical base transceiver station, wherein the processor is configured to remap the broadcast channel of the logical base transceiver station to each broadcast channel of each serving physical base transceiver station, wherein the processor is configured to remap the assigned packet data channels of the logical base transceiver station to each set of packet data channels of each serving physical base transceiver station, and wherein the processor is configured to remap each traffic channel of the logical base transceiver station to one of traffic channels of the plurality of serving base transceiver stations.

14. The mobile telecommunication system according to claim 13, wherein the mobile telecommunication system comprises an aggregation gateway configured to communicate via an IP network with a plurality of physical base transceivers stations.

15. The mobile telecommunication system according to claim 13, wherein the processor is further configured to forward the call traffic, subsequent to remapping the timeslot, to a base station controller (BSC) in the case of inbound call traffic or to the serving physical base transceiver stations in the case of outbound call traffic.

16. A computer program product for providing mobile telecommunication service, the computer program product being embodied in a non-transitory computer readable medium and comprising computer instructions for:
receiving a call traffic associated with a call associated at a mobile network with an assigned timeslot of a logical base transceiver station, wherein the logical base transceiver station is seen as a single logical transceiver base station by the base station controller, wherein the logical base transceiver station represents a plurality of serving physical base transceiver stations, wherein the logical base transceiver station comprises a plurality of logical transceivers, wherein the plurality of logical transceivers have a pooled number of logical timeslots, wherein the pooled number of logical timeslots includes a single broadcast channel and a set number of assigned packet data channels;
remapping a timeslot with which the call traffic is associated from the assigned timeslot to a serving timeslot being used at a serving physical base transceiver to facilitate the call, in the event the call traffic comprises inbound call traffic being sent into the mobile network from the serving physical base transceiver, or from the serving timeslot to the assigned timeslot in the event the call traffic comprises outbound call traffic being sent from the mobile network to the serving physical base transceiver station, wherein each serving physical base transceiver station has its own physical transceiver, each physical transceiver having its own serving timeslots;
remapping the broadcast channel of the logical base transceiver station to each broadcast channel of each serving physical base transceiver station;
remapping the assigned packet data channels of the logical base transceiver station to each set of packet data channels of each serving physical base transceiver station; and remapping each traffic channel of the logical base transceiver station to one of traffic channels of the plurality of serving base transceiver stations.

17. A method of providing mobile telecommunication service, comprising:

receiving an indication that a call to be provided via a serving physical base transceiver station is associated at a mobile network with an assigned timeslot of a logical base transceiver station; and configuring the serving physical base transceiver station to operate with respect to a serving timeslot of the serving physical base transceiver station, which serving timeslot corresponds to the assigned timeslot of the logical base transceiver station, at a selected one of a plurality of frequencies at which the serving physical base transceiver station is configured to operate with respect to the serving timeslot, the selected frequency corresponding to an assigned frequency associated at the mobile network with the logical base transceiver station, wherein the logical base transceiver station is seen as a single logical transceiver base station by a base station controller, wherein the logical base transceiver station represents a plurality of serving physical base transceiver stations, wherein the logical base transceiver station comprises a plurality of logical transceivers, wherein the plurality of logical transceivers have a pooled number of logical timeslots, wherein the pooled number of logical timeslots includes a single broadcast channel and a set number of assigned packet data channels, wherein each serving physical base transceiver station has its own physical transceiver, each physical transceiver having its own serving timeslots, wherein the broadcast channel of the logical base transceiver station is remapped to each broadcast channel of each serving physical base transceiver station, wherein the assigned packet data channels of the logical base transceiver station is remapped to each set of packet data channels of each serving physical base transceiver station, and wherein each traffic channel of the logical base transceiver station is remapped to one of traffic channels of the plurality of serving base transceiver stations.

18. The method according to claim 17, wherein each logical transceiver is associated at the mobile network with a corresponding one of the plurality of frequencies.

19. The method according to claim 18, wherein each of said physical base transceiver stations comprises a physical base transceiver (TRX) configured to operate as required, one each of a plurality of physical base transceiver timeslots, at a selected one of the plurality of frequencies.

* * * * *